(12) United States Patent
Wolff et al.

(10) Patent No.: US 10,377,363 B2
(45) Date of Patent: Aug. 13, 2019

(54) PARKING BRAKE IN A VEHICLE

(71) Applicant: Robert Bosch GmbH, Stuttgart (DE)

(72) Inventors: Helmut Wolff, Untergruppenbach (DE); Simon Hauber, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/738,347

(22) PCT Filed: Apr. 26, 2016

(86) PCT No.: PCT/EP2016/059243
§ 371 (c)(1),
(2) Date: Dec. 20, 2017

(87) PCT Pub. No.: WO2016/206833
PCT Pub. Date: Dec. 29, 2016

(65) Prior Publication Data
US 2018/0178771 A1    Jun. 28, 2018

(30) Foreign Application Priority Data

Jun. 22, 2015  (DE) .......................... 10 2015 211 409

(51) Int. Cl.
*B60T 1/06*    (2006.01)
*F16G 1/00*    (2006.01)
(Continued)

(52) U.S. Cl.
CPC ............ *B60T 13/741* (2013.01); *B60T 1/065* (2013.01); *B60T 13/58* (2013.01); *B60T 13/588* (2013.01);
(Continued)

(58) Field of Classification Search
CPC ...... B60T 13/741; B60T 13/588; B60T 1/065; B60T 13/58; B60T 13/74; B60T 17/22;
(Continued)

(56) References Cited

U.S. PATENT DOCUMENTS 7,227,324 B2 *   6/2007   Erben ..................... B60T 7/045
                                                        318/362
8,397,879 B2 *   3/2013   Maron ................... B60T 13/588
                                                        188/158

(Continued)

FOREIGN PATENT DOCUMENTS

DE           103 61 042 B3     5/2005
DE        10 2005 022 400 A1   11/2006
(Continued)

OTHER PUBLICATIONS

Specification translation of DE 102011005842 obtained at website: https://worldwide.espacenet.com/ on Jan. 8, 2019.*
(Continued)

*Primary Examiner* — Pamela Rodriguez
(74) *Attorney, Agent, or Firm* — Maginot, Moore & Beck LLP

(57) ABSTRACT

A parking brake for a vehicle includes an electric brake motor, a transmission, and a brake piston. The transmission transfers a drive movement of the motor to the brake piston. The transmission has a transmission efficiency that steadily increases as a temperature in the transmission rises.

10 Claims, 1 Drawing Sheet

(51) Int. Cl.

| | |
|---|---|
| *B60T 13/58* | (2006.01) |
| *B60T 13/74* | (2006.01) |
| *B60T 17/22* | (2006.01) |
| *F16D 65/18* | (2006.01) |
| *F16H 19/00* | (2006.01) |
| *F16H 57/04* | (2010.01) |
| *F16D 121/02* | (2012.01) |
| *F16D 121/24* | (2012.01) |
| *F16D 123/00* | (2012.01) |
| *F16D 125/40* | (2012.01) |
| *F16D 125/44* | (2012.01) |

(52) U.S. Cl.
CPC ............. *B60T 13/74* (2013.01); *B60T 17/22* (2013.01); *F16D 65/18* (2013.01); *F16D 65/183* (2013.01); *F16G 1/00* (2013.01); *F16H 19/005* (2013.01); *F16H 57/04* (2013.01); *F16D 2121/02* (2013.01); *F16D 2121/24* (2013.01); *F16D 2123/00* (2013.01); *F16D 2125/40* (2013.01); *F16D 2125/44* (2013.01)

(58) Field of Classification Search
CPC .......... F16H 19/005; F16H 57/04; F16G 1/00; F16D 2125/40; F16D 65/18; F16D 65/183; F16D 2121/02; F16D 2121/24; F16D 2123/00; F16D 2125/44
USPC ............ 188/72.3, 72.1, 72.6–72.9, 156–158, 188/159–162; 701/70, 78
See application file for complete search history.

(56) References Cited

U.S. PATENT DOCUMENTS

| | | | | |
|---|---|---|---|---|
| 9,108,599 | B2* | 8/2015 | Blattert | .................... B60T 8/172 |
| 9,701,290 | B2* | 7/2017 | Baehrle-Miller | ....... B60T 8/171 |
| 2011/0278108 | A1* | 11/2011 | Watanabe | ............... B60T 7/042 |
| | | | | 188/72.3 |
| 2012/0022737 | A1* | 1/2012 | Kumazaki | .............. B60K 23/00 |
| | | | | 701/22 |
| 2014/0172259 | A1* | 6/2014 | Blattert | .................... B60T 8/172 |
| | | | | 701/70 |
| 2015/0362032 | A1* | 12/2015 | Son | ......................... F16D 65/18 |
| | | | | 188/72.1 |

FOREIGN PATENT DOCUMENTS

| | | |
|---|---|---|
| DE | 10 2006 052 810 A1 | 5/2008 |
| DE | 10 2008 055 632 A1 | 5/2010 |
| DE | 10 2010 004 222 A1 | 7/2010 |
| DE | 10 2010 024 590 A1 | 2/2011 |
| DE | 10 2011 005 842 A1 | 9/2012 |
| DE | 10 2012 206 223 A1 | 10/2013 |
| DE | 10 2013 005 744 A1 | 10/2014 |
| EP | 1 650 463 A1 | 4/2006 |
| WO | 2009/053429 A1 | 4/2009 |

OTHER PUBLICATIONS

International Search Report corresponding to PCT Application No. PCT/EP2016/059243, dated Aug. 8, 2016 (German and English language document) (7 pages).

* cited by examiner

PARKING BRAKE IN A VEHICLE

This application is a 35 U.S.C. § 371 National Stage Application of PCT/EP2016/059243, filed on Apr. 26, 2016, which claims the benefit of priority to Serial No. DE 10 2015 211 409.0, filed on Jun. 22, 2015 in Germany, the disclosures of which are incorporated herein by reference in their entirety.

The disclosure relates to a parking brake in a vehicle.

BACKGROUND

DE 103 61 042 B3 describes a parking brake in a vehicle, with which a clamping force can be produced which holds the vehicle when stationary. The electromechanical parking brake comprises an electric brake motor which moves a brake piston, carrying a brake pad, axially in the direction of a brake disc.

An electromechanical braking device used as a parking brake is also described in DE 10 2006 052 810 A1. The drive movement of the electric brake motor is transmitted via a gear mechanism to the spindle, and from there to the brake piston.

The various components of the electromechanical braking device normally have a temperature dependency. For example, the motor constant of the electric brake motor, on which the clamping force provided depends, diminishes as the temperature rises. The gear mechanism and spindle also have a temperature dependency, wherein because of the kinematic action chain of the brake motor, gear mechanism and spindle, the total efficiency is composed of a concatenation of individual efficiencies and consequently has a high temperature dependency.

SUMMARY

The parking brake according to the disclosure is preferably used to produce a clamping force holding the vehicle when stationary. The parking brake comprises an electromechanical braking device with an electric brake motor, the drive movement of which can be transmitted via a gear mechanism to a brake piston. The brake piston presses a brake pad against a brake disc, generating the clamping force. On actuation of the electric brake motor, the rotary movement of the rotor of the brake motor is translated into an axial positioning movement of a spindle, via which the brake piston with the brake pad is pressed axially against the brake disc. The brake piston is preferably the brake piston of the hydraulic vehicle brake and is pressed against the brake disc by the hydraulic pressure.

The parking brake is provided with a temperature-compensating motor-gear unit which comprises the electric brake motor and the gear mechanism, via which the drive movement of the brake motor is transmitted to the spindle. By means of the temperature compensation, a temperature-independent total efficiency is achieved in the electromechanical braking device so that, independently of the actual temperature in the braking device, an at least approximately constant total efficiency always prevails. This has the advantage that the clamping force produced in the electromechanical braking device can be determined more easily and more precisely. The clamping force can be expressed with adequate approximation by multiplying the total efficiency by the actual motor current and the resulting radius of the gear-spindle reduction for converting the motor torque. In particular, it is no longer necessary to determine the temperature-dependent motor constant of the brake motor in order to determine the clamping force.

In the parking brake according to the disclosure, the gear mechanism is configured such that the transmission efficiency rises constantly as the temperature in the motor-gear unit rises. The constant rise in the transmission efficiency here compensates for the constant fall in temperature-dependent motor constant and the constant fall in temperature-dependent spindle efficiency. The constant rise in transmission efficiency is sufficiently large to compensate for the fall in motor constant and spindle efficiency as the temperature increases. The result is therefore a total efficiency which is at least approximately constant for all temperatures occurring.

The constant rise in transmission efficiency is preferably achieved in that a deterioration in transmission efficiency occurs at low temperatures and is accepted, wherein as the temperature rises, the transmission efficiency approximates to the efficiency which would have prevailed in the gear mechanism without the efficiency-changing measures. In gear mechanisms known from the prior art, the efficiency initially rises at low temperatures and then falls again, wherein the falling branch of the transmission efficiency coincides with the falling motor constant and the falling spindle efficiency. With the design according to the disclosure however, at low temperatures a known deterioration in efficiency in the gear mechanism can be accepted, so that although at low temperatures the transmission efficiency is poorer than in the designs of the prior art, as the temperature increases a constantly rising efficiency curve is achieved.

The temperature-dependent constant rise in transmission efficiency comprises both monotonously rising and strictly monotonously rising efficiency curves.

Monotonously rising curves allow gradient-free portions with constant efficiency, wherein as a whole over the temperature range concerned, the transmission efficiency increases. Strictly monotonously rising curves however have a continuous rise.

Both linear and non-linear rises are considered. It is advantageous to provide a linear rise in transmission efficiency which compensates for a linear fall in motor constant and a linear fall in spindle efficiency.

According to a suitable embodiment, at least one gear component has a higher stiffness at low temperatures. Accordingly, this gear mechanism has a lower stiffness at high temperatures. The gear component is for example a drive belt, via which in particular a motor shaft of the electric brake motor is coupled to a gear shaft of the gear mechanism. Because of the higher stiffness at low temperatures, deformation work must be performed in order to deform the drive belt, whereby at low temperatures the transmission efficiency deteriorates. At higher temperatures, where applicable on exceeding of the limit temperature, the stiffness of the gear component is reduced so that accordingly less deformation work need be performed, which improves the transmission efficiency. Accordingly, as the temperature rises, a constantly rising transmission efficiency occurs.

The drive belt is preferably configured as a toothed belt and consists for example of polyurethane. The drive belt may have a modulus of elasticity between 10 N/mm² and 24 N/mm².

The gear component has the higher stiffness preferably in a negative temperature range, for example between −40° C. and 0° C. When the freezing point is passed, the gear component advantageously has a lower stiffness. The positive temperature range in which the gear mechanism is typically used extends for example up to 90° or 105°.

The stiffness of the gear component may change continuously depending on temperature, or alternatively have jumps in stiffness, in particular in the region of the freezing point.

The constant rise in transmission efficiency over temperature may be achieved or supported additionally or alternatively via a corresponding lubricating oil in the gear mechanism. At higher temperatures, in particular at temperatures in the positive range, the lubricating oil has an optimized lubrication. In this case too, a continuous improvement in lubrication or a stepped improvement as the temperature rises may be considered.

In addition or alternatively to the drive belt which is part of the gear mechanism, a further gear component may also have a high stiffness at low temperatures. Furthermore, gear mechanisms without drive belts may be considered, wherein in this case too, a gear component advantageously has a higher stiffness at low temperatures.

BRIEF DESCRIPTION OF THE DRAWINGS

Further advantages and suitable embodiments are disclosed in the further claims, the description of the figures and in the drawings. The drawings show:

DETAILED DESCRIPTION

Figure 1:
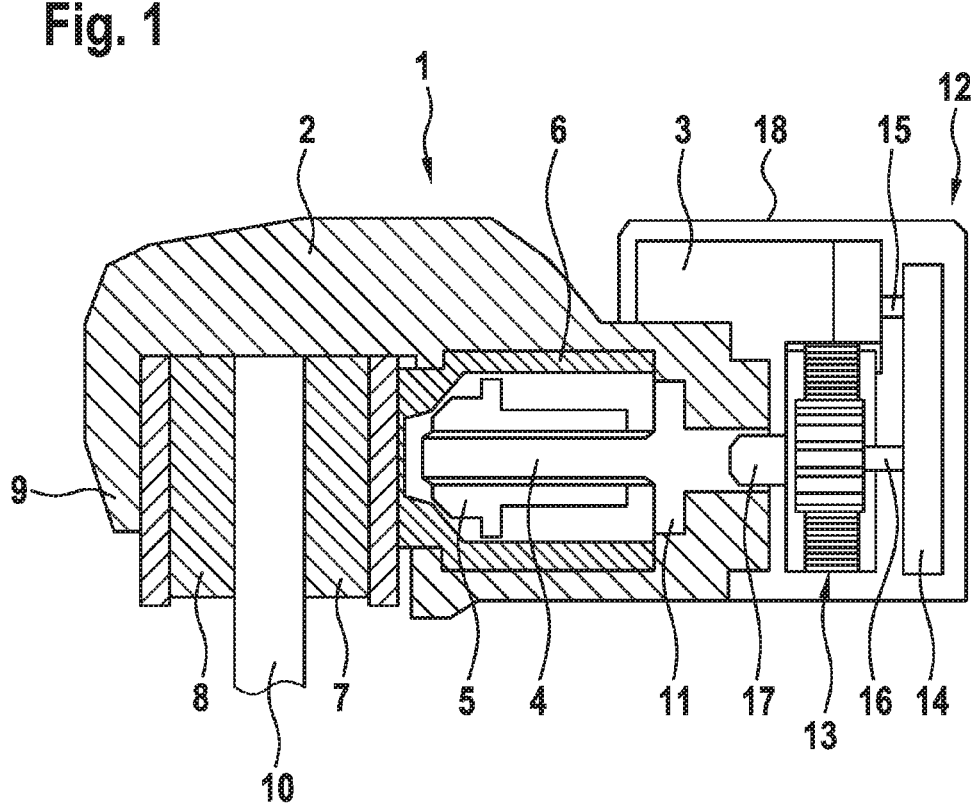
FIG. 1 a section through an electromechanical braking device for a vehicle in which braking force is produced via an electric brake motor, FIG. 2 an illustration showing the development of the transmission efficiency depending on temperature.

The electromechanical braking device 1 shown in FIG. 1 comprises a brake caliper 2 with pincers 9 which extend over a brake disc 10. As an actuator, the braking device 1, which may be used as a parking brake, has a DC electric motor as a brake motor 3, the rotor shaft of which drives a spindle 4 in rotation, on which a spindle nut 5 is rotatably mounted. On rotation of the spindle 4, the spindle nut 5 is displaced axially. The spindle nut 5 moves inside a brake piston 6 carrying a brake pad 7 which is pressed by the brake piston 6 against the brake disc 10. On the opposite side of the brake disc 10 is a further brake pad 8, which is held stationarily on the pincers.

Inside the brake piston 6, on a rotary movement of the spindle 4, the spindle nut 5 can move axially forward in the direction of the brake disc 10, or on an opposing rotary movement of the spindle 4, axially backward until it reaches a stop 11. To generate a clamping force, the spindle nut 5 loads the inner face of the brake piston 6, whereby the brake piston 6, which is mounted axially displaceably in the electromechanical braking device 1, with the brake pad 7 is pressed against the corresponding face of the brake disc 10.

The parking brake may if necessary be supported by a hydraulic vehicle brake, so that the clamping force is composed of an electromotor part and a hydraulic part. On hydraulic support, the back of the brake piston 6 facing the brake motor is loaded with hydraulic fluid under pressure.

The electric brake motor 3 is part of a motor-gear unit 12, which also includes a gear mechanism 13 which transmits the drive movement of the rotor of the brake motor 3 to the spindle 4. The gear mechanism 13 includes a drive belt 14 for coupling the motor shaft 15 of the electric brake motor 3 to a gear input shaft 16. A gear output shaft 17 on the output side of the gear mechanism 13 is connected to the spindle 4. The gear mechanism 13 is arranged parallel to the electric brake motor 3 and received together therewith in a housing 18 of the motor-gear unit 12. The housing 18 is connected to the brake caliper 2.

Figure 2:
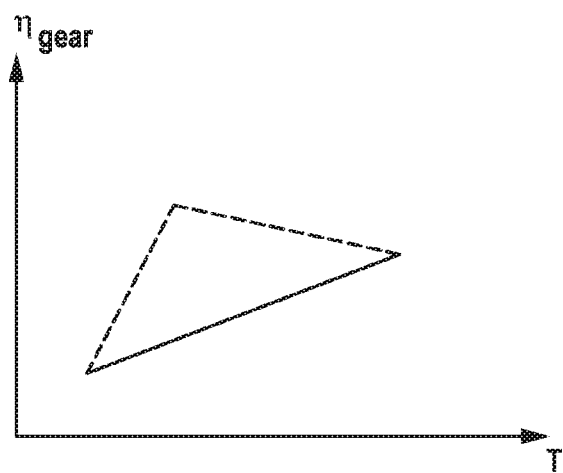

In the illustration in FIG. 2, the transmission efficiency $\eta_{gear}$, is depicted as a function of the temperature T prevailing in the motor-gear unit 12. The solid line depicts the actual transmission efficiency $\eta_{gear}$, the dotted line depicts the original transmission efficiency without the optimization according to the disclosure. The actual transmission efficiency $\eta_{gear}$, is shown as a rising straight line, whereas the dotted original efficiency, which runs above the actual transmission efficiency $\eta_{gear}$, has a bend. Until the bend is reached, the original efficiency rises more steeply and then falls again. The optimized efficiency according to the solid line indeed runs at a lower level but has a continuous constant rise, so the transmission efficiency does not diminish again as the temperature rises.

Because of the constant and continuous rise in transmission efficiency, a fall in the motor constant of the brake motor and a fall in spindle efficiency as the temperature rises can be compensated. In this way, as a whole over the action chain of the electric brake motor, gear mechanism and spindle, an at least approximately constant total efficiency results, from which the clamping force of the electromechanical braking device can easily be determined by multiplication with the actual motor current and the resulting radius of the gear-spindle reduction.

The constant and continuous rise in transmission efficiency according to the solid line in FIG. 2 is achieved in particular by the selection of the drive belt with the corresponding material behavior. The drive belt consists for example of polyurethane and has a modulus of elasticity between 10 N/mm² and 24 N/mm². In particular in the negative temperature range, the drive belt has a higher stiffness so that as the drive belt 14 circulates, continuous deformation work must be exerted on the drive belt, which significantly reduces the transmission efficiency $\eta_{gear}$. In this way, as a comparison of the two curves in FIG. 2 shows, at low temperatures the transmission efficiency $\eta_{gear}$ is poorer, but as described above, a transmission efficiency curve is achieved which is configured as a rising straight line depending on temperature. This curve of the transmission efficiency leads to the desired compensation for the motor constant which falls as the temperature rises, and for the falling spindle efficiency.

The invention claimed is:

1. A parking brake for a vehicle, comprising:
   a brake piston that is displaceable in a direction of a brake disc;
   an electromechanical braking device that includes an electric brake motor; and
   a gear mechanism configured to transmit a drive movement of the electric brake motor to the brake piston, the gear mechanism having a transmission efficiency that rises constantly as a temperature of the gear mechanism rises.

2. The parking brake as claimed in claim 1, wherein the gear mechanism includes at least one gear component having a stiffness that increases at lower temperatures.

3. The parking brake as claimed in claim 2, wherein the at least one gear component includes a drive belt.

4. The parking brake as claimed in claim 3, wherein:
   the electric brake motor includes a drive shaft;
   the gear mechanism includes a gear shaft; and
   the drive belt couples the motor shaft of the electric brake motor to the gear shaft.

5. The parking brake as claimed in claim 3, wherein the drive belt has a modulus of elasticity between 10 N/mm² and 24 N/mm².

6. The parking brake as claimed in claim 2, wherein the transmission efficiency rises constantly as the temperature rises over an entire temperature usage range.

7. The parking brake as claimed in claim 1, wherein the transmission efficiency rises linearly as the temperature rises.

8. The parking brake as claimed in claim 1, wherein the gear mechanism is configured such that the rise in transmission efficiency as the temperature increases compensates for a fall in efficiency of the electric brake motor as the temperature rises.

9. The parking brake as claimed in claim 1, further comprising:
   a spindle configured to displace the brake piston;
   wherein the gear mechanism is configured such that the rise in transmission efficiency compensates for a fall in efficiency of the spindle.

10. The parking brake as claimed in claim 1, further comprising:
   a lubricating oil that supports the constant rise in transmission efficiency as the temperature rises.

\* \* \* \* \*